Figure 1:
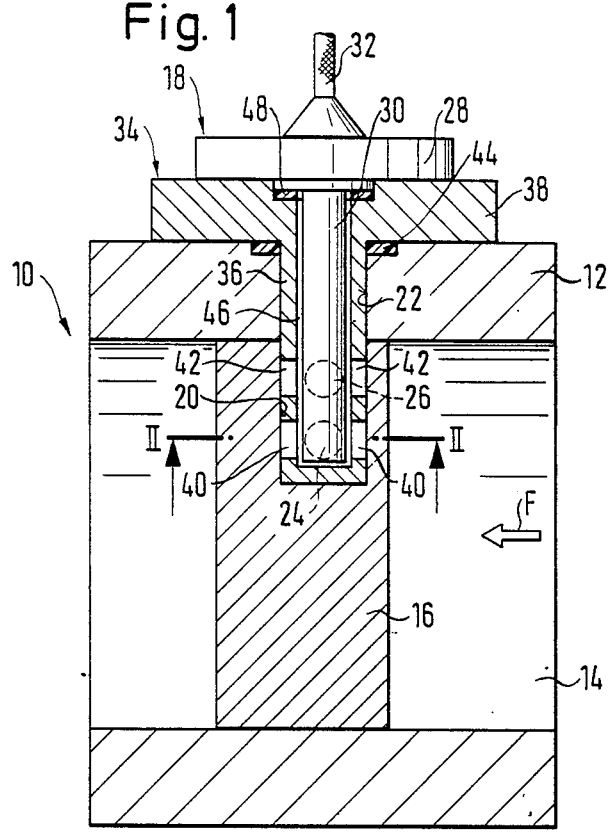

United States Patent [19]

Steiner

[11] Patent Number: 4,922,759
[45] Date of Patent: May 8, 1990

[54] VORTEX FREQUENCY FLOW METER

[75] Inventor: Kurt Steiner, Reinach BL 1, Switzerland

[73] Assignee: Flowtec AG, Reinach, Switzerland

[21] Appl. No.: 305,394

[22] Filed: Feb. 1, 1989

[30] Foreign Application Priority Data

Feb. 3, 1988 [DE] Fed. Rep. of Germany ....... 3803192

[51] Int. Cl.$^5$ ............................................. G01F 1/32
[52] U.S. Cl. .................................................. 73/861.22
[58] Field of Search ............ 73/861.22, 861.23, 861.24

[56] References Cited

U.S. PATENT DOCUMENTS

| 3,732,731 | 5/1973 | Fussell. | |
|---|---|---|---|
| 3,979,954 | 9/1976 | Ide et al. | 73/861.24 |
| 4,434,668 | 3/1984 | Shinoda et al. | |
| 4,694,702 | 9/1987 | Amemori et al. | 73/861.24 |

FOREIGN PATENT DOCUMENTS 2204269 4/1981 Fed. Rep. of Germany.

Primary Examiner—Herbert Goldstein
Attorney, Agent, or Firm—Barnes & Thornburg

[57] ABSTRACT

The vortex frequency flow meter has a tube body which comprises a flow passage for the medium of which the flow is to be measured. In the flow passage a bluff body is arranged which generates Kármán vortices of which the recurrence frequency is proportional to the flow velocity of the medium. A sensor which responds to the pressure fluctuations generated by the vortices is arranged in a cavity which communicates via passages with the flow passage so that the pressure fluctuations are conveyed to the cavity. The passages can be closed by a shutoff member which is adjustable from outside by an actuating member. It is thus possible to remove the sensor from the cavity after the closure of the passages without the flow medium being able to emerge.

6 Claims, 5 Drawing Sheets

VORTEX FREQUENCY FLOW METER

The invention relates to a vortex frequency flow meter having a tube body which comprises a flow passage for the medium of which the flow is to be measured, a bluff body arranged in the flow passage for generating vortices having a recurrence frequency which is proportional to the flow velocity of the medium, and at least one sensor which responds to the pressure fluctuations generated by the vortices and is arranged in a cavity which communicates via closable passages with the flow passage.

The invention originates from the field of flow measurement utilizing the principle of the Kármán vortices. According to this principle, when a suitable bluff body opposes a turbulent flow as an obstacle periodically and locally alternating vortices detach from said body. The frequency of said vortex detachments and the resulting pressure fluctuations is proportional to the flow velocity.

In the practical operation of such flow meters it may occur that the sensor responding to the pressure fluctuations must be removed from the cavity in which it is arranged for the purpose of cleaning, maintenance or repair. To prevent the cavity from continuing to be subjected to the pressure of the flowing medium through the passages which connect said cavity to the flow passage and thus prevent the possible exit of flowing medium via the cavity it is known from US-PS 4,434,668 to make the passages closable. For this purpose in the bluff body a cavity is formed which accommodates the sensor in its upper portion communicating via the passages with the flow passage whilst in the lower portion a piston-like closure member is mounted which is pressed by a spring against the end of the sensor. When the sensor is removed from the cavity the spring relaxes and the piston-like closure member moves upwardly through the cavity. In doing so the piston-like closure member moves over the passages and if the sensor has been completely removed from the cavity the piston-like closure member closes from the outside the portion of the cavity connected via the passages to the flow passage. When the sensor is again introduced into the cavity it presses the piston-like closure member downwardly against the force of the spring. Since in this known vortex frequency flow meter the movement of the piston-like closure member in the closure direction is effected only by the spring force during the removal of the sensor, in the case of flow media which cause deposits there is a danger of the closure member getting stuck so that the communication between the flow passage and the outer space is not interrupted. The spring force must be relatively small since otherwise it opposes the introduction of the sensor with too great a resistance and this obstructs precise introduction of the sensor and with sensitive sensors involves a risk of mechanical damage. Furthermore, it is not possible to block the connection between the flow passage and the cavity accommodating the sensor without removing the sensor. Also to be considered a disadvantage is that the passages are not closed until the sensor has already been partially removed from the cavity and that during the introduction of the sensor they already open again. Finally, the known solution is suitable only for vortex frequency flow meters of which the bluff body is so large that a cavity can be formed therein having a cross-section and length sufficient to accommodate both the sensor as well as the piston-like closure member and the spring. Such large bluff bodies are found only in vortex frequency flow meters with large nominal widths, i.e. large diameters of the flow passage.

The problem underlying the invention is to provide a vortex frequency flow meter of the type mentioned at the beginning in which a reliable closure of the passages is possible independently of removal of the sensor and which is suitable also for small nominal widths or diameters.

This problem is solved according to the invention in that for closing the passages a shutoff member adjustable by an actuating member from the outside is provided.

In the vortex frequency flow meter according to the invention the passages which connect the flow passage to the cavity receiving the sensor can be closed and opened by means of the actuating member irrespective of whether the sensor is in the cavity or not. The closure force is governed by the force exerted on the actuating member, which is not restricted to the force of a spring and in the case of a resistance caused for example by deposits can be made as large as desired. The passages can be completely closed before the removal of the sensor has started and they are not opened again until the sensor has been completely introduced into the cavity. In this manner even sensitive sensors can be introduced easily and precisely into the still closed cavity without any mechanical stress.

The invention is suitable both for vortex frequency flow meters of large nominal widths in which the bluff body has such a large cross-section that a cavity adequate for accommodating the sensor and the shutoff member can be formed therein, as well as for vortex frequency flow meters of small nominal widths in which the cavity receiving the sensor is formed in the wall of the tube body.

Advantageous further developments and embodiments of the invention are characterized in the subsidiary claims.

Figure 2:
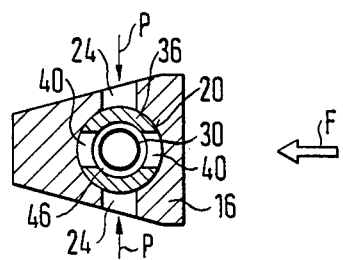
Figure 3:
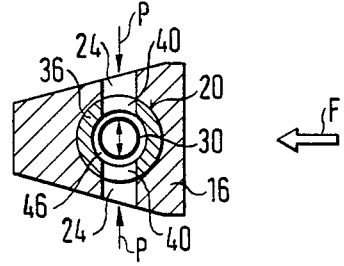
Figure 4:
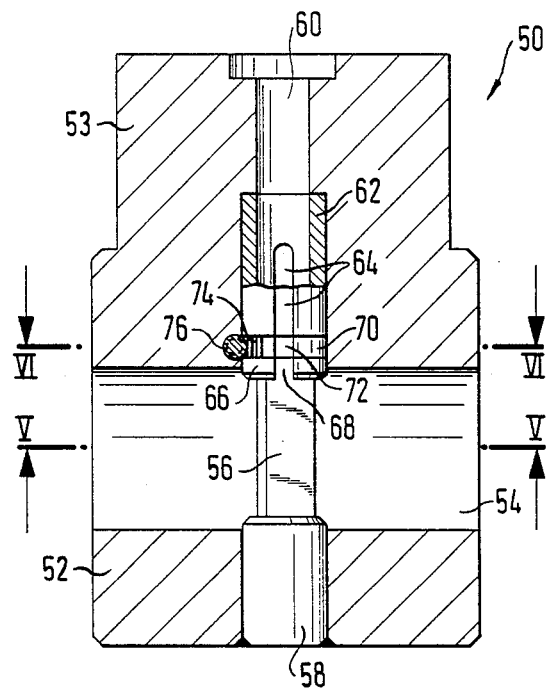
Figure 5:
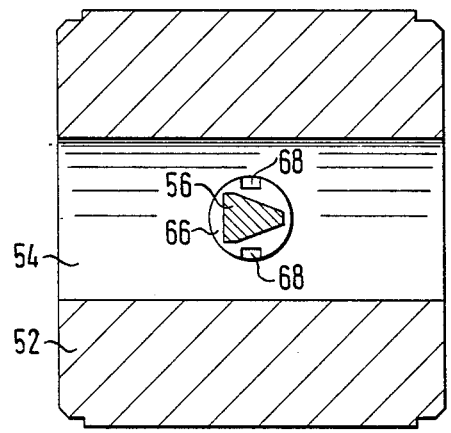
Figure 6:
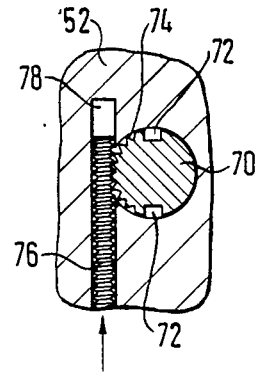
Figure 7:
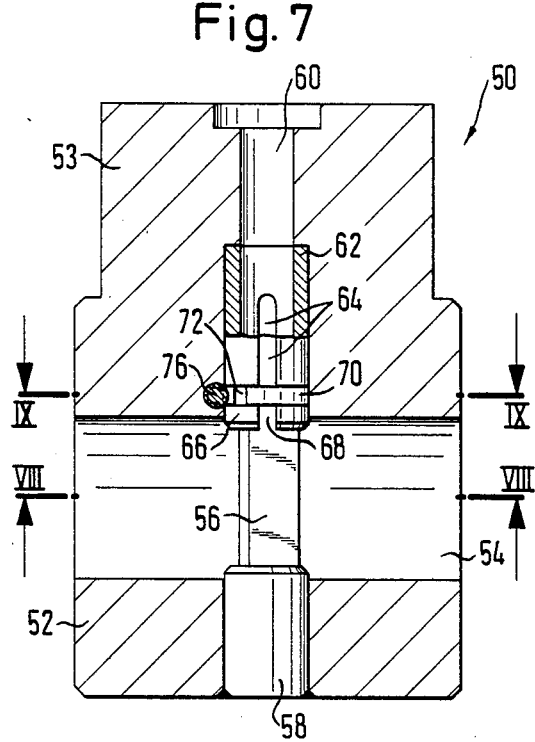
Figure 8:
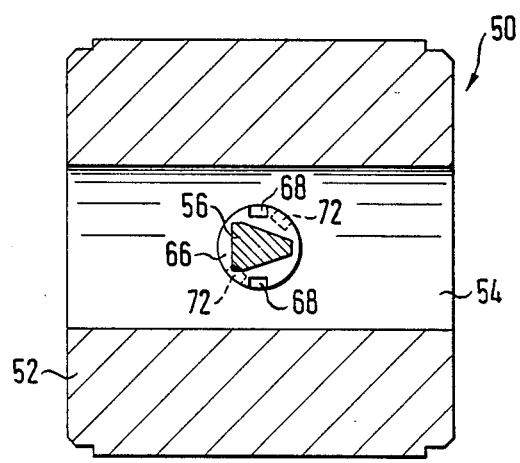
Figure 9:
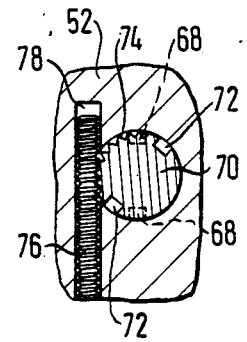
Figure 10:
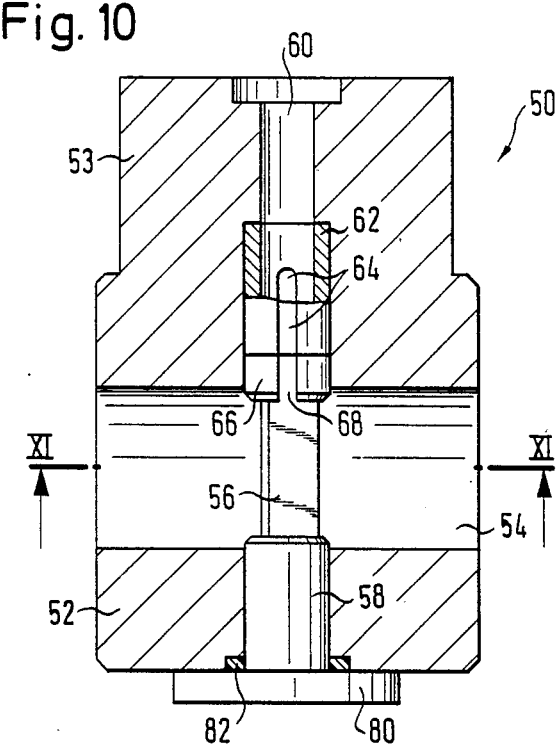
Figure 11:
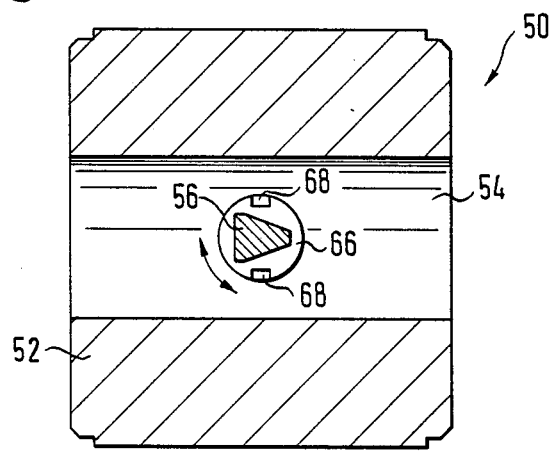
Figure 12:
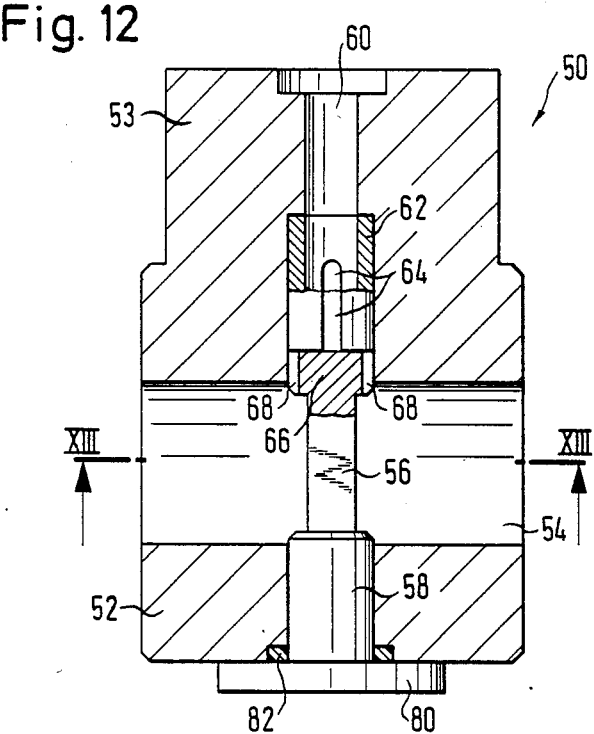
Figure 13:
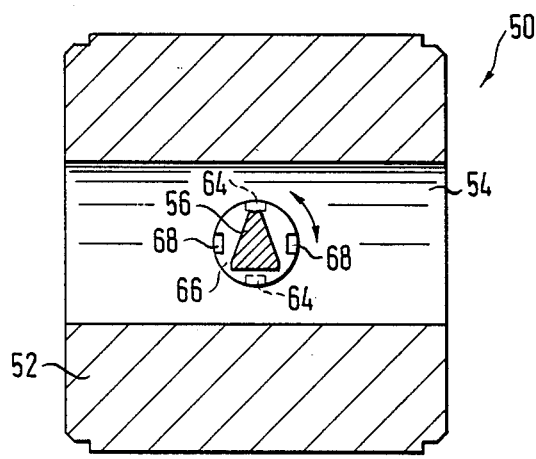

Further features and advantages of the invention will be apparent from the following description of examples of embodiment which are illustrated in the drawings, wherein:

FIG. 1 shows a longitudinal section through a vortex frequency flow meter according to a first embodiment of the invention, FIG. 2 is a sectional view along the line II—II of FIG. 1, the shutoff member being in the blocking position, FIG. 3 is the same sectional view as FIG. 2, the shutoff member being in the open position, FIG. 4 is a longitudinal section through a vortex frequency flow meter according to a second embodiment of the invention, the shutoff member being in the open position, FIG. 5 is a sectional view along the line V—V of FIG. 4, FIG. 6 is a partial sectional view along the line VI—VI of FIG. 4, FIG. 7 is a longitudinal section through the vortex frequency flow meter of FIG. 4, the shutoff member being in the blocking position, FIG. 8 is a sectional view along the line VIII—VIII of FIG. 7, FIG. 9 is a sectional view along the line IX—IX of FIG. 7, FIG. 10 is a longitudinal section through a vortex frequency flow meter according to a third embodiment of the invention, the shutoff member being in the open position, FIG. 11 is a sectional view along the line IX—IX of FIG. 10, FIG. 12 is a longitudinal section through the vortex frequency flow meter of FIG. 10, the shutoff member being in the blocking position and FIG. 13 is a sectional view along the line XIII—XIII of FIG. 12.

The vortex frequency flow meter 10 illustrated in longitudinal section in FIG. 1 comprises a tube body 12 which is inserted into a conduit or pipeline, not illustrated, so that the medium of which the flow is to be measured flows in the direction of the arrow F through the cylindrical flow passage 14 of the tube body 12. In the tube body 12 a bluff body 16 is arranged in such a manner that it extends transversely to the flow direction diametrically through the flow passage 14. The bluff body 16 is mounted at both ends on the inner wall of the tube body 12, for example by welding. The bluff body 16 is a prismatic body of which the cross-section is substantially trapezoidal, as apparent in the sectional views of FIGS. 2 and 3, and the face of the prism corresponding to the major base line of the trapezium points upstream and lies perpendicularly to the flow direction. As is known, a bluff body of this type produces in the medium flowing past Kármán vortices which downstream of the bluff body form two parallel vortex trails, the vortices of the one vortex trail being offset with respect to the vortices of the other vortex trail. The measurement of the flow velocity of the medium is based on the fact that the distance between consecutive vortices in a vortex trail is approximately constant over a large range of flow velocities. The recurrence frequency of the Kármán vortices is thus proportional to the flow velocity. The vortex frequency flow meter 10 is therefore so designed that it furnishes an electrical signal which is characteristic of the recurrence frequency of the Kármán vortices. To generate said electrical signal use is made of the fact that the vortices cause pressure fluctuations with the same frequency. The vortex frequency flow meter 10 includes a sensor assembly 18 which responds to the pressure fluctuations generated by the vortices and generates an electrical signal dependent on the frequency of said pressure fluctuations.

In the upper portion of the bluff body 16 a cylindrical cavity 20 is formed which extends from the end of the bluff body axially over a portion of the length thereof. Running through the wall of the tube body 12 coaxially with the cavity 20 is a bore 22 which has the same diameter as the cavity 20. In the bluff body 16 passages or holes are formed which from the side faces of the prism open transversely to the flow direction into the cavity 20. A first pair of passages 24 is formed near the lower end of the cavity 20 and a second pair of passages 26 is disposed spaced thereabove near the upper end of the cavity 20. The passages 24 and 26 may have a circular cross-section as indicated in dashed line in FIG. 1.

The sensor assembly 18 comprises a sensor support 28 which is mounted outside the tube body 12 and on which the sensor 30 responsive to the pressure fluctuations is arranged in such a manner that it projects through the bore 22 into the cavity 20 of the bluff body 16 and its free end lies substantially at the level of the lower passages 24. The sensor 30 may be formed in any manner known per se in vortex frequency flow meters. For example, the part of the sensor 30 visible in FIG. 1 may be a sensor sleeve which is closed at the lower end and which is set in oscillation by the pressure fluctuations which are caused by the vortices and are transmitted through the passages 24 and 26 into the cavity 12 and in the interior of which an oscillation sensor not shown in the drawings is arranged which converts the oscillations of the sensor sleeve into an electrical signal which has the same frequency as the pressure fluctuations and is transmitted via a cable 32 to an evaluating device, not shown.

The oscillation sensor may be constructed in a manner known per se as piezoelectric or capacitive sensor.

As further essential component of the vortex frequency flow meter 10 a shutoff member 34 is provided which consists of a blocking bush 36 which is connected at one end to an actuating member 38. The blocking bush 36 is a hollow cylinder which is closed at the lower end and is inserted through the bore 22 into the cavity 20. The outer diameter of the blocking bush 36 corresponds to the diameter of the cavity 20 so that it fits substantially free of play but rotatably in the cavity 20, and the length of the blocking bush 36 is so dimensioned that its sealed lower end extends up to the bottom of the cavity 20 when the actuating member 38 bears on the outer surface of the tube body 12. In the blocking bush 36 two pairs of radial passages 40 and 42 are disposed in such a manner that they lie at the level of the passages 24 and 26 respectively of the bluff body 16 when the blocking bush 36 is inserted into the cavity 20. A seal 44 which is inserted into an annular groove at the outer surface of the wall of the tube body 12 surrounds the end of the blocking bush 36 connected to the actuating member 38.

The sensor 30 is inserted in turn into the hollow interior of the blocking bush 36. Its outer diameter is smaller than the inner diameter of the blocking bush 36 so that between the sensor 30 and the blocking bush 36 an annular intermediate space 46 is present. The lower end of the sensor 30 lies spaced from the bottom of the blocking bush 36 when the sensor 30 is inserted completely into the blocking bush 36. Between the actuating member 38 and the portion of the sensor support 28 adjoining said member a seal 48 is provided which is inserted into an annular groove at the upper side of the actuating member 38.

When the parts assume the position illustrated in FIGS. 1 and 2 the passages 40 and 42 of the blocking bush 36 are turned through 90° with respect to the passages 24, 26 of the bluff body 16. In this position the blocking bush 36 interrupts the connection between the flow passage 14 and the cavity 20 so that no flow medium can pass from the flow passage 14 into the cavity 20. Accordingly, the pressure fluctuations caused by the vortices and indicated in FIG. 2 by the arrows P are also unable to act on the sensor 30 projecting into the cavity 20. The vortex frequency flow meter 10 is thus out of operation in this position of the blocking bush 36. It is however possible to remove the sensor assembly 18 from the flow meter and take the sensor 30 out of the cavity 20 without flow medium being able to emerge. This enables maintenance or repair work to be carried out on the sensor without having to remove the bluff body 16 and without any necessity of interrupting the flow of the medium through the flow passage 14.

When the sensor assembly 18 has been correctly installed in the flow meter 10 again so that the sensor 30 assumes the position shown in FIG. 1 the flow measurement can be started simply by turning the blocking bush 36 through 90° into the position shown in FIG. 3 in which the passages 40 coincide with the passages 24 and in corresponding manner the passages 42 coincide with the passages 26. In this position of the blocking bush 36 flow medium can flow out of the flow passage 14 through the passages into the intermediate space 46 and the pressure fluctuations caused by the vortices can act on the sensor 30 and set the latter in oscillation as indicated by a double arrow in FIG. 3.

The rotation of the blocking bush 36 may for example be by hand by means of an actuating member 38. Conveniently, at a suitable point on the tube body 12 or the bluff body 16 on the one hand and the shutoff member on the other stops are arranged which limit the 90° rotational movement of the shutoff member.

Since the sensor 30 has a certain minimum diameter the embodiment according to FIGS. 1 to 3 is suitable mainly for flow meters of relatively large nominal widths (diameters of the flow passage 14) in which the bluff body 16 is large enough to have room in its interior for a cavity 20 which can accommodate the sensor 30 in addition to the blocking bush 36. In flow meters with small nominal widths the bluff body is so small that the sensor can no longer be accommodated in the interior thereof. Below embodiments are described which are suitable for flow meters with small nominal widths.

The vortex frequency flow meter 50 illustrated in FIGS. 4 to 9 has a tube body 52 in the flow passage 54 of which a bluff body 56 is disposed. The bluff body 56 is solid and provided at the lower end with a cylindrical extension 58 which is mounted in a bore in the wall of the tube body 52, for example by welding. For simplification, the sensor assembly is not shown in FIGS. 4 to 9. The cavity 60 intended for accommodation of the sensor is not formed in the interior of the bluff body 56 in this case but in alignment with the axis of the bluff body in the wall of the tube body 52 which has a thickening 53 at this point to obtain adequate axial length of the cavity 60. The cavity 60 comprises in its lower region adjacent the bluff body 56 a somewhat greater diameter than in the upper region and into said region of larger diameter a bush 62 is inserted of which the inner diameter is equal to the small diameter of the upper region of the cavity 60. In the bush 62 two diametrically opposite slots 64 are formed which extend from the lower end of the bush over the greater part of the length thereof upwardly. Said slots 64 lie in a diameter plane of the flow passage 52 lying perpendicularly to the flow direction.

At the upper end of the bluff body 56 a disc-shaped collar 66 is integrally formed and has the same outer diameter as the bush 62 and is located beneath the bush 62 in the widened region of the cavity 60. At the edge of the collar 66 two diametrically opposite cutouts 68 are disposed in such a manner that they lie in axial alignment with the slots 64.

Between the facing end faces of the bush 62 and of the collar 66 as shutoff member a rotatable blocking disc 70 is inserted which has the same diameter as the bush 62 and the collar 66. At the edge of the blocking disc 70 two diametrically opposite cutouts 72 are disposed which have the same form as the cutouts 68 of the collar 66. Between the cutouts 72 the blocking disc 70 is provided over a portion of its periphery with a toothing 74 (FIGS. 6 and 9) into which engages the toothing of a rack 76 which is mounted longitudinally displaceably in a bore 78 in the wall of the tube body 52. By displacing the rack 76 the blocking disc 70 can thus be turned through a limited angle.

In FIGS. 4, 5 and 6 the blocking disc 70 is set by means of the rack 76 in such a manner that the cutouts 72 thereof align with the cutouts 68 of the collar 66 and with the slots 64 of the bush 62. In this position of the components the flow medium can flow from the flow passage 54 through the cutouts 68 and 72 and through the slots 64 into the cavity 60 and the pressure fluctuations caused by the vortices can act on the sensor (not shown in the drawings) located in the cavity 60.

In contrast, in FIGS. 7, 8 and 9 the blocking disc 70 is turned by means of the rack 76 in such a manner that its cutouts no longer align with the cutouts 68 of the collar 66 and the slots 64 of the bush 62. The blocking disc 70 thus interrupts the connection between the flow passage 54 and the cavity 60 so that no flow medium from the flow passage 54 can enter the cavity 60 and the pressure fluctuations caused by the vortices can no longer be transmitted to the cavity 60. In this position of the blocking disc 70 the sensor assembly can be removed without any danger of flow medium emerging.

FIGS. 10 to 13 show a modification of the embodiment of FIGS. 4 to 9, corresponding parts being provided with the same reference numerals as in FIGS. 4 to 9 and not being described again. The embodiment of FIGS. 10 to 13 differs from that of FIGS. 4 to 9 only in the following respect:

the blocking disc 70 and the rack 78 are omitted and the collar 66 engages directly at the lower end of the bush 62;

the bluff body 56 is rotatably mounted by means of the cylindrical extension 58 in the tube body 52 and the rotation can for example be made manually by means of an actuating member 80 attached to the cylindrical extension 58, a seal 82 effecting the necessary sealing.

In this embodiment the collar 66 forms the shutoff member. When the bluff body 56 assumes the position illustrated in FIGS. 10 and 11 in which it has the correct position for generating the Kármán vortices, the cutouts 68 in the collar 66 align with the slots 64 of the bush 62 so that flow medium from the flow passage 54 can enter the cavity 60 and the pressure fluctuations caused by the vortices can be transmitted to the cavity 60. If however the bluff body 56 is rotated from this position through 90° so that it assumes the position illustrated in FIGS. 12 and 13 the cutouts 68 are offset with respect to the slots 64 so that the connection between the flow passage 54 and the cavity 60 is interrupted. In this position of the bluff body 56 the sensor assembly can be removed without the flow medium being able to emerge.

As can be seen in the embodiments of FIGS. 4 to 13 the cross-section of the cavity 60 intended for accommodation of the sensor can be of the same order of magnitude as or even larger than the cross-section of the bluff body. Consequently, this embodiment is also particularly suitable for flow meters with small nominal widths.

I claim:

1. Vortex frequency flow meter having a tube body which comprises a flow passage for the medium of which the flow is to be measured, a bluff body arranged in the flow passage for generating vortices having a recurrence frequency which is proportional to the flow velocity of the medium, and at least one sensor which responds to the pressure fluctuations generated by the vortices and is arranged in a cavity which communicates via closable passages with the flow passage, characterized in that the cavity is formed in the interior of the bluff body, that the closable passages are formed in the bluff body, that a rotatable shutoff member is provided for closing the closable passages, that an actuating member is provided for rotating the shutoff member from the outside of the tube body, and that the shutoff member is a hollow cylindrical blocking bush which is arranged rotatably in the cavity and which has openings formed therein which by rotation of the blocking bush can be brought into or out of coincidence with the closable passages.

2. Vortex frequency flow meter having a tube body which comprises a flow passage for the medium of which the flow is to be measured, a bluff body arranged in the flow passage for generating vortices having a recurrence frequency which is proportional to the flow velocity of the medium, and at least one sensor which responds to the pressure fluctuations generated by the vortices and is arranged in a cavity which communicates via closable passages with the flow passage, characterized in that the cavity and the closable passages are arranged in the tube body, that a rotatable shutoff member is provided for closing the closable passages, that an actuating member is provided for rotating the shutoff member from the outside of the tube body, and that the shutoff member is a circular member which closes an end of the cavity and which has openings formed therein which by rotation of the circular member can be brought into or out of coincidence with the closable passages.

3. Vortex frequency flow meter according to claim 2, characterized in that the shutoff member is a disc which is rotatably mounted at the end of the cavity in a wall of the tube body.

4. Vortex frequency flow meter according to claim 3, characterized in that the actuating member comprises a rack which engages into a toothing disposed on the disc.

5. Vortex frequency flow meter according to claim 2, characterized in that the bluff body is rotatably mounted in the tube body and that the shutoff member is a collar which is disposed at an end of the bluff body adjacent the end of the cavity and which has openings formed therein which by rotation of the bluff body can be brought into or out of coincidence with the closable passages.

6. Vortex frequency flow meter according to claim 5, characterized in that at the end of the bluff body opposite the collar a cylindrical extension is disposed which is rotatably mounted in a bore in the wall of the tube body and that the actuating member is attached to the end of the cylindrical extension outside the tube body.

* * * * *